Dec. 29, 1936.  G. PIELSTICK  2,066,224

VIBRATION DAMPER FOR SHAFTS

Filed March 19, 1935

Inventor
Gustav Pielstick
by Maréchal + Noe
attys.

Patented Dec. 29, 1936

2,066,224

UNITED STATES PATENT OFFICE 2,066,224

VIBRATION DAMPER FOR SHAFTS

Gustav Pielstick, Augsburg, Germany, assignor to Maschinenfabrik Augsburg-Nürnberg A. G., Augsburg, Germany, a corporation of Germany Application March 19, 1935, Serial No. 11,834
In Germany March 28, 1934

4 Claims. (Cl. 74—574)

This invention relates to vibration dampers for shafts, especially crank shafts of internal combustion engines, wherein a flywheel mass is resiliently connected with the shaft. For this resilient connection, helical springs have been used, which, however, have only a small damping capacity. A material having a damping capacity, for example rubber, has also been used for the direct connection. When using rubber a better damping (about 30%) is certainly achieved than when using spiral springs, but the low mechanical strength of the rubber has here been found to have an undesirable effect, as the metal parts of the damper limiting the elastic intermediate material work into this material and gradually destroy it. The premature fatiguing of the rubber, which leads to a gradual reduction of its elasticity, also renders this material unsuitable for vibration-damping devices.

According to the invention, the elastic and damping connecting members between the additional flywheel mass and the shaft consist of sleeve springs stressed transversely in relation to their longitudinal axis, which are formed of individual nested or telescoped sleeves slotted on one longitudinal side and made of resilient material, a solid cylindrical core against which the springs bear according to the load being arranged in the inner hollow space of these sleeves. The core is separate from but is provided within a series of the nested sleeve springs and provides an abutment which controls the amount of spring flexure. The amount of spring movement is thus controlled so that it asymptotically approaches a limiting point which is such as to prevent spring stresses above the elastic limit of the spring, so that its elasticity is maintained even under heavy stresses. This advantage and the exceptionally great damping capacity (about 70%) owing to the great inner friction of the individual spring sleeves against one another and owing to the work of deformation carried out by the rolling contact on the solid core, render these sleeve springs highly suitable for use in vibration dampers.

A constructional example of a vibration damper according to the invention is illustrated in the accompanying drawing, wherein—

Figure 1:
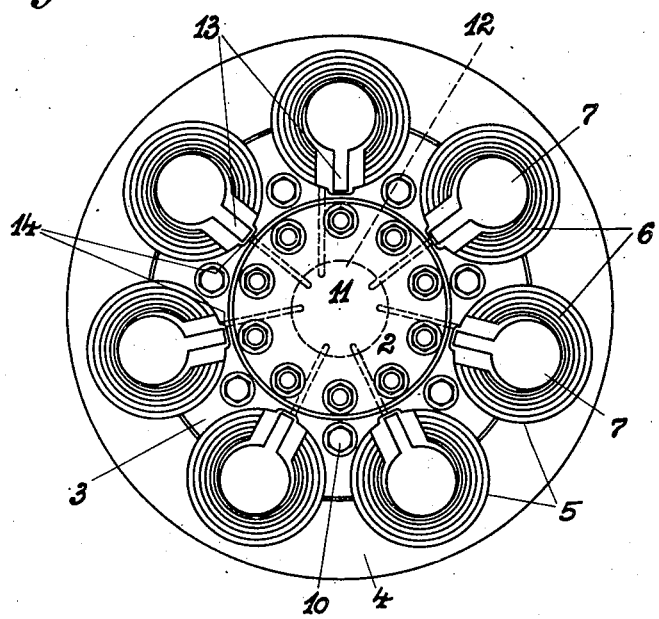
Figure 2:
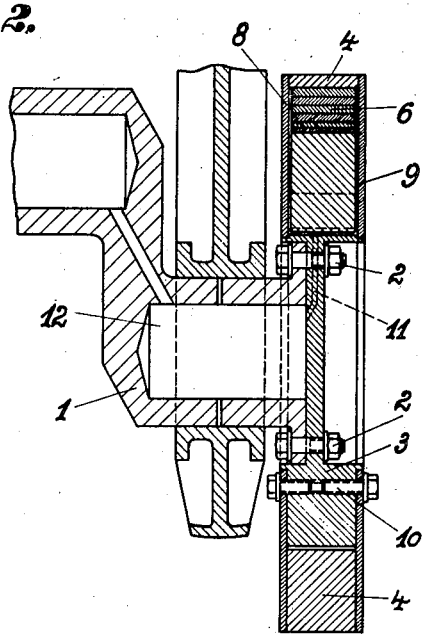

Figure 1 is a plan view of the damping device, the lateral limiting plates being removed, and Figure 2 is a section through the damping device and a portion of a crank shaft, to which it is secured.

A disc-like plate 3 is connected to the crank shaft 1 by means of screws 2. An annular flywheel mass 4 is concentrically arranged about this plate 3. The sleeve springs 6 which are comprised of a series of nested leaf springs of cylindrical curvature but open along one side, are fitted with their inner solid cores 7 into the common borings 5, the centre point of which preferably lies in the neighbourhood of the joint separating the plate 3 and the flywheel ring 4. The core is separate from but provided within the nested sleeve springs, the core having a cylindrical curved portion in contact with the middle part of the inner spring of a series, as shown in Fig. 1, the end parts of the inner spring being spaced some distance from the core when the plate 3 and the flywheel mass 4 are in their normal position indicated in Fig. 1. The lateral plates 8 and 9, which are secured to the plate 3 by means of the screws 10, serve to prevent the flywheel ring 4 and the springs 6 with their cores 7 from being laterally displaced. Each of the cores 7 is provided with a longitudinal rib 13, which projects through the slot provided by the open side of the spring sleeves and engages in a groove 14 in the plate 3. Rotation of the cores and consequently of the springs within the individual borings is thereby prevented. The springs therefore always retain a position favourable to their stressing. The plate 3 is also provided with a number of radially directed borings 11, which connect the individual spring spaces with the lubricating oil pipe 12 inside the crank shaft 1, so that even under heavy stresses the parts of the vibration damper moved against one another, in particular the individual sleeves of each spring, work practically without wear.

Having now particularly described and ascertained the nature of my said invention and in what manner the same is to be performed, I declare that what I claim is:—

1. In a device of the character described, a crank shaft having a portion provided with an annular series of semi-circular grooves, a flywheel mass surrounding said portion and having a series of semi-circular grooves each adjacent a groove of the crank shaft portion, closure means at the ends of said grooves, a series of nested sleeve springs of cylindrical curvature throughout substantially their entire length but open along one side provided in each of said grooves and movably supporting said flywheel mass on said crank shaft for damping crankshaft vibration, and a core in each series of nested springs having gradually increasing restraining effect as the spring flexure increases for limiting the maximum amount of spring flexure to a predetermined amount below the elastic limit of the sleeve springs.

2. In a device of the character described, a shaft having a portion provided with an annular series of semi-circular grooves, a driven member having a series of semi-circular grooves each adjacent a groove of the shaft portion, closure means at the ends of said grooves, nested sleeve springs of cylindrical curvature and of substantially C-shape and open at one side provided in said grooves for resiliently connecting the shaft and driven member, a core in each series of nested springs for gradually limiting the spring flexure to a predetermined amount below the elastic limit of the sleeve springs, and lubricant supply passages extending to said grooves.

3. In a device of the character described, a crank shaft having a portion provided with an annular series of semi-circular grooves, a flywheel mass surrounding said portion and having a series of semi-circular grooves each adjacent a groove of the crank shaft portion, closure means at the ends of said grooves, nested sleeve springs of cylindrical curvature but open along one side provided in said grooves and movably supporting said flywheel mass on said crank shaft for damping crank shaft vibration, said sleeve springs having a damping capacity of the order or 70%, a core in each series of nested springs for limiting the maximum amount of spring flexure to a predetermined amount below the elastic limit of the sleeve springs, said crank shaft having a lubricant passage therein, and lubricant supply passages extending therefrom to said grooves.

4. In a device of the character described, a crank shaft having a portion provided with an annular series of semi-circular grooves, a flywheel mass surrounding said portion and having a series of semi-circular grooves each adjacent a groove of the crank shaft portion, a series of nested sleeve springs of cylindrical curvature throughout substantially their entire length and open along one side so as to be of substantially C-shape provided in each of said grooves removably supporting said flywheel mass on said crank shaft for damping crank shaft vibration, and means in each series of nested springs and engaging the free ends of said springs for maintaining the open sides of the springs facing in a radial direction.

GUSTAV PIELSTICK.